US011990043B2

(12) United States Patent
Pfau

(10) Patent No.: US 11,990,043 B2
(45) Date of Patent: May 21, 2024

(54) PROCESSOR AND PROCESSING METHOD FOR RIDER-ASSISTANCE SYSTEM OF STRADDLE-TYPE VEHICLE, RIDER-ASSISTANCE SYSTEM OF STRADDLE-TYPE VEHICLE, AND STRADDLE-TYPE VEHICLE

(71) Applicant: Robert Bosch GmbH, Stuttgart (DE)

(72) Inventor: Lars Pfau, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 433 days.

(21) Appl. No.: 17/298,082

(22) PCT Filed: Dec. 2, 2019

(86) PCT No.: PCT/IB2019/060362
§ 371 (c)(1),
(2) Date: May 28, 2021

(87) PCT Pub. No.: WO2020/115638
PCT Pub. Date: Jun. 11, 2020

(65) Prior Publication Data
US 2022/0020274 A1    Jan. 20, 2022

(30) Foreign Application Priority Data

Dec. 6, 2018   (JP) ................. 2018-228680

(51) Int. Cl.
*G08G 1/16*    (2006.01)
*B60Q 1/50*    (2006.01)
(Continued)

(52) U.S. Cl.
CPC ............ *G08G 1/166* (2013.01); *B60Q 1/50* (2013.01); *B60Q 1/535* (2022.05);
(Continued)

(58) Field of Classification Search
CPC ......... G08G 1/166; G08G 1/162; B62J 45/20; B62J 50/21; B62J 50/25; B60W 30/143; B60W 2300/36
See application file for complete search history.

(56) References Cited

U.S. PATENT DOCUMENTS 5,777,290 A * 7/1998 Tzanev ................ G01C 9/10
335/205
9,153,133 B1 * 10/2015 Lunsford .............. G08G 1/166
(Continued)

FOREIGN PATENT DOCUMENTS

DE   202017107397 U1 * 1/2018 ............ B60W 30/08
EP   2894617 A1    7/2015
(Continued)

OTHER PUBLICATIONS

International Search Report and Written Opinion for Application No. PCT/IB2019/060362 dated Feb. 20, 2020 (11 pages).

*Primary Examiner* — Luis A Martinez Borrero
(74) *Attorney, Agent, or Firm* — Michael Best & Friedrich LLP

(57) ABSTRACT

The present invention obtains a processor and a processing method, a rider-assistance system, and a straddle-type vehicle capable of improving a rider's safety.
A processor (20) includes: an acquisition section that acquires surrounding environment information about a straddle-type vehicle (100); a determination section that determines necessity of assistance operation executed by a rider-assistance system (1) to assist with the rider's operation; and a control section that makes an execution device (P) execute the assistance operation in the case where the determination section determines that the assistance operation is necessary. The determination section determines the necessity of the assistance operation by using: a collision index value that is an index value of a collision possibility (Continued)

of a following vehicle against the traveling straddle-type vehicle (100); and a stability index value that is an index value of a stability degree of a relative distance of the following vehicle to the traveling straddle-type vehicle (100).

13 Claims, 2 Drawing Sheets

(51) Int. Cl.
 *B60W 30/14* (2006.01)
 *B62J 45/20* (2020.01)
 *B62J 50/21* (2020.01)
 *B62J 50/25* (2020.01)

(52) U.S. Cl.
 CPC ............ *B60W 30/143* (2013.01); *B62J 45/20* (2020.02); *B62J 50/21* (2020.02); *B62J 50/25* (2020.02); *G08G 1/162* (2013.01); *B60W 2300/36* (2013.01)

(56) References Cited

U.S. PATENT DOCUMENTS

| | | | | |
|---|---|---|---|---|
| 9,767,693 | B2* | 9/2017 | Lee | G08G 1/166 |
| 10,029,683 | B1* | 7/2018 | Ginther | B60T 7/12 |
| 10,377,308 | B2* | 8/2019 | Savaresi | B62J 50/22 |
| 10,429,501 | B2* | 10/2019 | Pineda-Deom | G06V 10/147 |
| 10,446,033 | B2* | 10/2019 | Mills | G01S 13/931 |
| 10,668,971 | B2* | 6/2020 | Denholm | B62J 45/41 |
| 10,913,507 | B2* | 2/2021 | Nishino | G01J 1/44 |
| 10,977,878 | B2* | 4/2021 | Morishima | B60W 40/09 |
| 11,009,876 | B2* | 5/2021 | Bielby | G05D 1/0088 |
| 11,242,052 | B2* | 2/2022 | Kaita | B60W 30/0956 |
| 11,447,150 | B2* | 9/2022 | Du | B60W 40/06 |
| 11,625,045 | B2* | 4/2023 | Becker | G05D 1/0088 701/23 |
| 11,634,151 | B2* | 4/2023 | Pfau | G06V 20/597 340/435 |
| 11,697,466 | B1* | 7/2023 | Shelton | B62J 6/24 340/903 |
| 11,724,762 | B2* | 8/2023 | Santucci | B60Q 1/38 340/435 |
| 11,727,794 | B2* | 8/2023 | Bielby | G08G 1/017 701/119 |
| 2008/0296880 | A1* | 12/2008 | Lin | B62J 45/4151 280/770 |
| 2009/0033475 | A1* | 2/2009 | Zuziak | B62J 3/10 340/432 |
| 2010/0019892 | A1 | 1/2010 | Roh et al. | |
| 2011/0015818 | A1* | 1/2011 | Breuer | B60W 30/085 701/31.4 |
| 2011/0118929 | A1* | 5/2011 | Takae | B60K 35/00 701/31.4 |
| 2011/0175767 | A1* | 7/2011 | Tsunekawa | G08G 1/166 342/107 |
| 2012/0259526 | A1* | 10/2012 | Inoue | B60W 40/112 701/70 |
| 2012/0300078 | A1* | 11/2012 | Ogata | G06V 40/10 348/148 |
| 2013/0155533 | A1* | 6/2013 | Hunter | B60R 1/007 359/842 |
| 2013/0311075 | A1* | 11/2013 | Tran | B60Q 1/535 701/117 |
| 2013/0335569 | A1* | 12/2013 | Einecke | G01S 13/867 348/148 |
| 2014/0019005 | A1* | 1/2014 | Lee | G08G 1/0962 701/301 |
| 2014/0236425 | A1* | 8/2014 | Savaresi | B60G 17/015 701/38 |
| 2015/0228066 | A1* | 8/2015 | Farb | G06V 20/58 348/148 |
| 2016/0075338 | A1* | 3/2016 | Henn | B60K 28/066 340/439 |
| 2016/0090037 | A1* | 3/2016 | Tetsuka | B60Q 9/008 340/435 |
| 2016/0363665 | A1* | 12/2016 | Carlson | B62J 50/225 |
| 2017/0001562 | A1* | 1/2017 | Bish | G01S 13/931 |
| 2017/0129466 | A1* | 5/2017 | Okubo | B60T 17/22 |
| 2017/0206789 | A1 | 7/2017 | Shimizu et al. | |
| 2017/0247042 | A1* | 8/2017 | Seidl | B60W 30/18145 |
| 2017/0294127 | A1* | 10/2017 | Nakatani | G01S 17/87 |
| 2017/0309179 | A1* | 10/2017 | Kodama | G01S 7/003 |
| 2017/0352277 | A1* | 12/2017 | Lee | G08G 1/166 |
| 2018/0004211 | A1* | 1/2018 | Grimm | G06Q 10/047 |
| 2018/0086405 | A1* | 3/2018 | Zheng | G01S 17/931 |
| 2018/0326906 | A1* | 11/2018 | Savaresi | B62J 45/413 |
| 2019/0172354 | A1* | 6/2019 | Hoffmann | B62J 6/056 |
| 2019/0176919 | A1* | 6/2019 | Santucci | B60Q 1/44 |
| 2019/0256162 | A1* | 8/2019 | Denholm | H04N 5/77 |
| 2019/0271777 | A1* | 9/2019 | Hiromitsu | G01S 13/931 |
| 2020/0286183 | A1* | 9/2020 | Furukawa | G08G 1/00 |
| 2021/0394855 | A1* | 12/2021 | Pfau | B60W 30/162 |
| 2022/0024480 | A1* | 1/2022 | Pfau | B60W 50/16 |
| 2023/0256987 | A1* | 8/2023 | Pfau | B60W 40/02 340/425.5 |

FOREIGN PATENT DOCUMENTS

| | | | | |
|---|---|---|---|---|
| EP | 3401198 A1 * | 11/2018 | ............ | B60Q 9/008 |
| EP | 3401198 A1 | 11/2018 | | |
| JP | 2009116882 A | 5/2009 | | |

* cited by examiner

[FIG. 1]
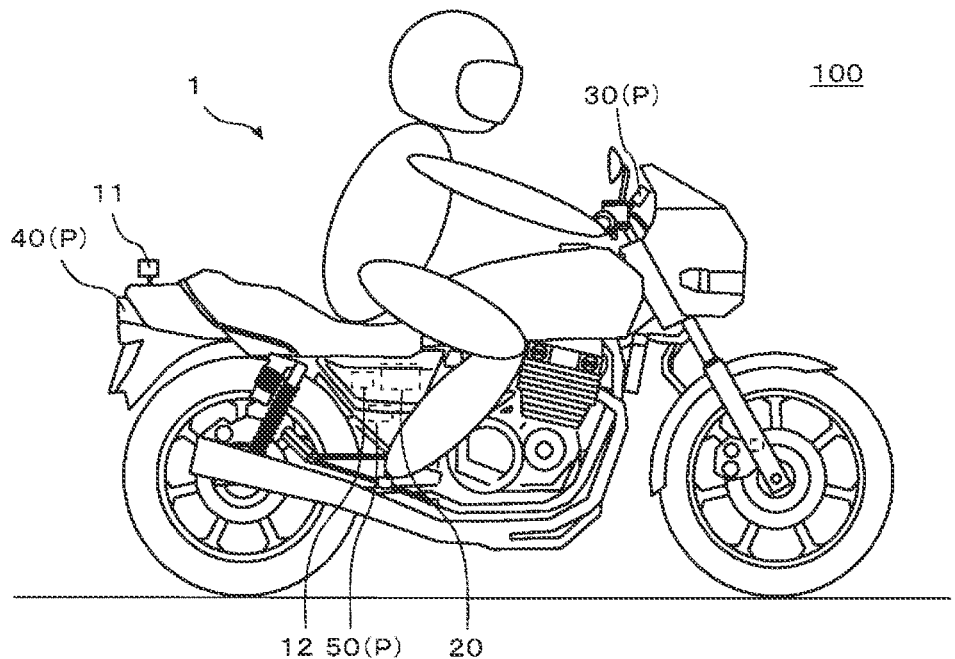
[FIG. 2]
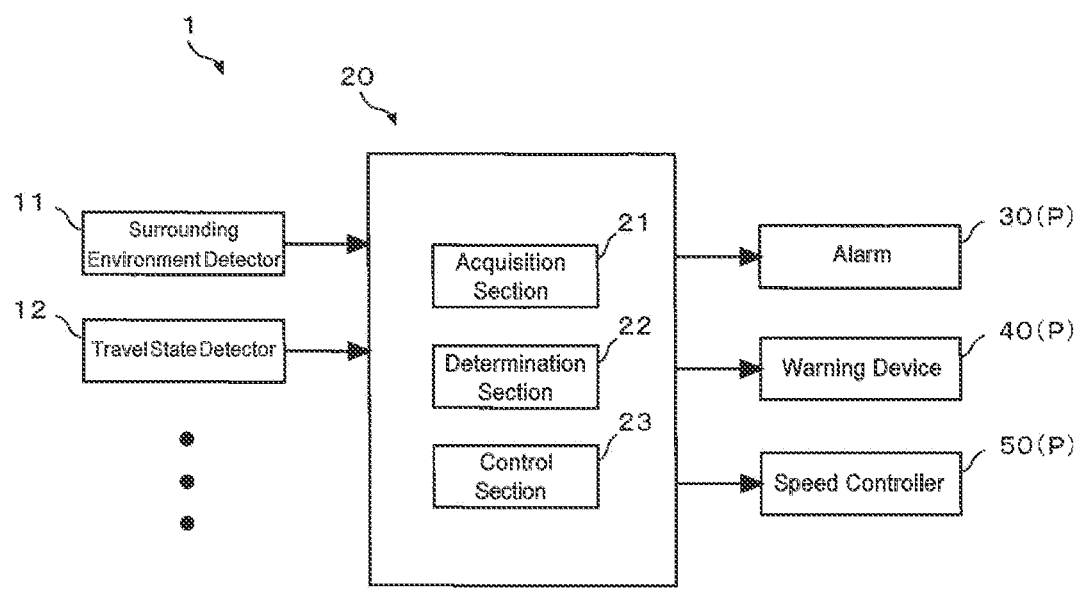

[FIG. 3]
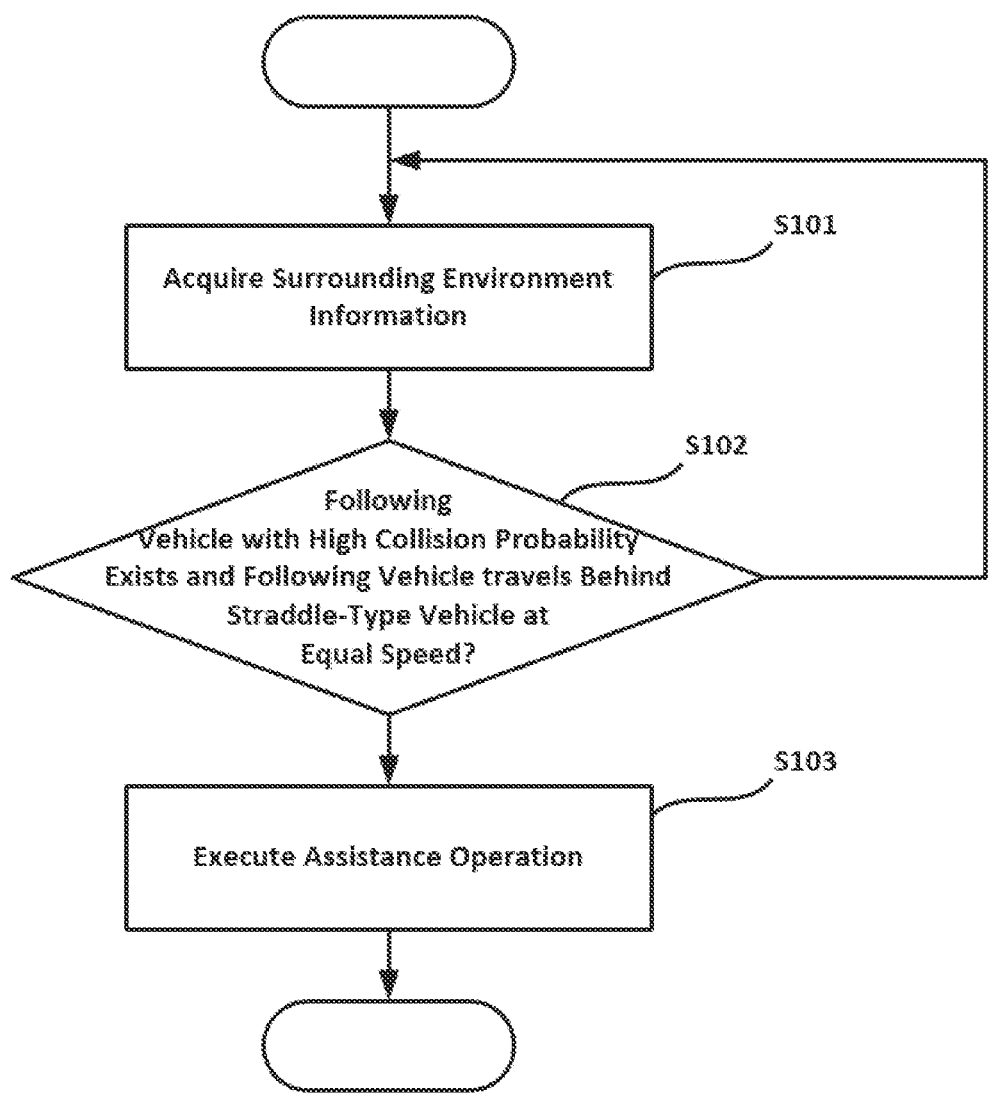

PROCESSOR AND PROCESSING METHOD FOR RIDER-ASSISTANCE SYSTEM OF STRADDLE-TYPE VEHICLE, RIDER-ASSISTANCE SYSTEM OF STRADDLE-TYPE VEHICLE, AND STRADDLE-TYPE VEHICLE

BACKGROUND OF THE INVENTION

The present invention relates to a processor and a processing method for a rider-assistance system that determines necessity of assistance operation to assist with a rider's operation by using surrounding environment information and executes the assistance operation when necessary, to a rider-assistance system including the processor, and to a straddle-type vehicle including the rider-assistance system.

As a conventional technique related to a straddle-type vehicle, a technique of assisting with a rider's operation is available. For example, a rider-assistance system is disclosed in JP-A-2009-116882. The rider-assistance system warns the rider of the straddle-type vehicle that the straddle-type vehicle inappropriately approaches an obstacle by using a surrounding environment detector that detects the obstacle present in a travel direction or substantially in the travel direction.

The rider operates the straddle-type vehicle while straddling and being seated on a vehicle body under a situation where a rearview mirror is not provided (that is, a situation where the rider cannot easily recognize what exists right behind the rider). Thus, necessity of assistance operation for the rider regarding a collision by a following vehicle is high. In addition, there is a high probability that the assistance operation is executed in a situation where the rider does not pay attention. Thus, the necessity of the assistance operation has to be determined with high reliability.

The present invention has been made with the above-described problem as the background and therefore obtains a processor and a processing method capable of improving a rider's safety. The present invention also obtains a rider-assistance system that includes the processor. The present invention further obtains a straddle-type vehicle that includes the rider-assistance system.

SUMMARY OF THE INVENTION

A processor according to the present invention is a processor for a rider-assistance system of a straddle-type vehicle, and includes: an acquisition section that acquires surrounding environment information about the straddle-type vehicle; a determination section that determines necessity of assistance operation executed by the rider-assistance system to assist with a rider's operation on the basis of the surrounding environment information acquired by the acquisition section; and a control section that makes an execution device execute the assistance operation in the case where the determination section determines that the assistance operation is necessary. The surrounding environment information includes information on surrounding environment behind the straddle-type vehicle. The determination section determines the necessity of the assistance operation by using: a collision index value that is an index value depending on the information on the surrounding environment at the rear and is an index value of a collision possibility of a following vehicle against the traveling straddle-type vehicle; and a stability index value that is an index value depending on the information on the surrounding environment at the rear and is an index value of a stability degree of a relative distance of the following vehicle to the traveling straddle-type vehicle.

A rider-assistance system according to the present invention includes the processor.

A straddle-type vehicle according to the present invention includes the rider-assistance system.

A processing method according to the present invention is a processing method for a rider-assistance system of a straddle-type vehicle, and includes: an acquisition step of acquiring surrounding environment information about the straddle-type vehicle by an acquisition section of a processor for the rider-assistance system; a determination step of determining necessity of assistance operation, which is executed by the rider-assistance system, by a determination section of the processor to assist with a rider's operation on the basis of the surrounding environment information acquired by the acquisition section; and a control step of making an execution device execute the assistance operation by a control section of the processor in the case where the determination section determines that the assistance operation is necessary. The surrounding environment information includes information on surrounding environment behind the straddle-type vehicle. In the determination step, the determination section determines the necessity of the assistance operation by using: a collision index value that is an index value depending on the information on the surrounding environment at the rear and is an index value of a collision possibility of a following vehicle against the traveling straddle-type vehicle; and a stability index value that is an index value depending on the information on the surrounding environment at the rear and is an index value of a stability degree of a relative distance of the following vehicle to the traveling straddle-type vehicle.

In the processor, the rider-assistance system, the straddle-type vehicle, and the processing method according to the present invention, the surrounding environment information, which includes the information on the surrounding environment behind the straddle-type vehicle, is acquired. The necessity of the assistance operation for the rider executed by the rider-assistance system is determined by using: the collision index value that is an index value depending on the information on the surrounding environment at the rear and is the index value of the collision possibility of the following vehicle against the traveling straddle-type vehicle; and the stability index value that is the index value depending on the information on the surrounding environment at the rear and is the index value of the stability degree of the relative distance of the following vehicle to the traveling straddle-type vehicle.

Thus, it is possible to execute the assistance operation for the rider regarding the collision by the following vehicle on the basis of the determination with high reliability. Therefore, the rider's safety is improved.

BRIEF DESCRIPTION OF THE DRAWINGS

FIG. 1 is a view of a mounted state of a rider-assistance system according to an embodiment of the present invention on a straddle-type vehicle.

FIG. 2 is a system configuration diagram of the rider-assistance system according to the embodiment of the present invention.

FIG. 3 is a chart of an operation flow of a processor in the rider-assistance system according to the embodiment of the present invention.

DETAILED DESCRIPTION

A description will hereinafter be made on a processor, a rider-assistance system, a straddle-type vehicle, and a processing method according to the present invention with reference to the drawings.

Note that each of a configuration, operation, and the like, which will be described below, is merely one example, and the processor, the rider-assistance system, the straddle-type vehicle, and the processing method according to the present invention are not limited to a case with such a configuration, such operation, and the like.

For example, a description will hereinafter be made on a case where the rider-assistance system according to the present invention is used for a two-wheeled motor vehicle. However, the rider-assistance system according to the present invention may be used for the straddle-type vehicle other than the two-wheeled motor vehicle. The straddle-type vehicle means a vehicle in general that a rider straddles. The straddle-type vehicles include motorcycles (the two-wheeled motor vehicle and a three-wheeled motor vehicle), an all-terrain vehicle, a pedal-driven vehicle, and the like. The motorcycles include: the two-wheeled motor vehicle or the three-wheeled motor vehicle that has an engine as a propelling source; the two-wheeled motor vehicle or the three-wheeled motor vehicle that has a motor as the propelling source; and the like, and include a motorcycle, a scooter, an electric scooter, and the like, for example. The pedal-driven vehicle means a vehicle in general that can travel forward on a road by a depressing force applied to pedals by the rider. The pedal-driven vehicles include a normal pedal-driven vehicle, an electrically-assisted pedal-driven vehicle, an electric pedal-driven vehicle, and the like.

The same or similar description will appropriately be simplified or will not be made below. In the drawings, the same or similar portions will be denoted by the same reference signs. In addition, a detailed structure will appropriately be illustrated in a simplified manner or will not be illustrated.

Embodiment

A description will hereinafter be made on a rider-assistance system according to an embodiment.

<Configuration of Rider-Assistance System>

A description will be made on a configuration of the rider-assistance system according to the embodiment.

FIG. 1 is a view of a mounted state of the rider-assistance system according to the embodiment of the present invention on a straddle-type vehicle. FIG. 2 is a system configuration diagram of the rider-assistance system according to the embodiment of the present invention.

As illustrated in FIG. 1 and FIG. 2, a rider-assistance system 1 is mounted on a straddle-type vehicle 100. The rider-assistance system 1 at least includes: a surrounding environment detector 11 that detects surrounding environment behind the straddle-type vehicle 100; a travel state detector 12 that detects a travel state of the straddle-type vehicle 100; a processor (ECU) 20; and an execution device P that executes assistance operation.

The rider-assistance system 1 plays a role of recognizing a collision possibility by a following vehicle against the traveling straddle-type vehicle 100 by using the surrounding environment detector 11 and assisting a rider by using the execution device P. The processor 20 acquires output of the surrounding environment detector 11 and output of the travel state detector 12, and outputs a control command to the execution device P. The processor 20 also receives output of various detectors (not illustrated) for detecting other information (for example, information on a brake operation state by the rider, information on an accelerator operation state by the rider, and the like). Each section of the rider-assistance system 1 may exclusively be used for the rider-assistance system 1, or may be shared with another system.

The surrounding environment detector 11 is a radar, a Lidar sensor, an ultrasonic sensor, a camera, or the like, for example, and continuously detects a distance and a direction of an object within a detection range from the straddle-type vehicle 100 during travel and a stop of the straddle-type vehicle 100. The surrounding environment detector 11 is preferably fixed to a portion behind a seat in the straddle-type vehicle 100.

The travel state detector 12 is a wheel speed sensor, an inertia sensor (IMU), and the like, for example, and detects a speed, acceleration, a roll angle, and the like that are generated on the straddle-type vehicle 100, for example.

The processor 20 includes an acquisition section 21, a determination section 22, and a control section 23. The sections of the processor 20 may collectively be provided in a single casing or may separately be provided in multiple casings. The processor 20 may partially or entirely be constructed of a microcomputer, a microprocessor unit, or the like, may be constructed of a member in which firmware or the like can be updated, or may be a program module or the like that is executed by a command from a CPU or the like, for example.

The acquisition section 21 acquires surrounding environment information, which includes information on the surrounding environment behind the straddle-type vehicle 100, on the basis of the output of the surrounding environment detector 11. The acquisition section 21 also acquires travel state information, which is information on the travel state of the straddle-type vehicle 100, on the basis of the output of the travel state detector 12.

The determination section 22 specifies an advancing direction of the straddle-type vehicle 100 from the travel state information acquired by the acquisition section 21, and specifies the following vehicle (a vehicle that travels behind the straddle-type vehicle 100 while following the straddle-type vehicle 100), the collision possibility of which should be determined, from the surrounding environment information acquired by the acquisition section 21. The determination section 22 may specify a travel lane of the straddle-type vehicle 100 from the surrounding environment information acquired by the acquisition section 21, and may specify a vehicle that travels on the same travel lane as the travel lane as the following vehicle, the collision possibility of which should be determined (the vehicle that travels behind the straddle-type vehicle 100 while following the straddle-type vehicle 100). Then, the determination section 22 derives a collision index value I, which is the collision possibility of the following vehicle against the straddle-type vehicle 100, for each of the specified following vehicles. That is, the collision index value I is an index value that depends on the information on the surrounding environment at the rear, and is defined as an index value of the collision possibility of the following vehicle against the straddle-type vehicle 100. The determination section 22 determines for each of the specified following vehicles whether the derived collision index value I exceeds a reference value, and thereby determines whether the following vehicle with the high collision possibility exists behind the straddle-type vehicle 100. The reference value may vary according to a setting state by the rider.

The collision index value I may be a reciprocal of a relative distance Dr of the following vehicle to the straddle-type vehicle 100, may be a relative speed Vr of the following vehicle to the straddle-type vehicle 100, may be relative acceleration Ar of the following vehicle to the straddle-type vehicle 100, or a combination of those. For example, the collision index value I is a value that is defined by Formula 1 or Formula 2 below. Here, it means that the collision possibility becomes higher as the collision index value I is increased.

$$I = \frac{Vr}{Dr} \quad \text{[Formula 1]}$$

$$I = \frac{Ar}{-Vr - \sqrt{Vr^2 - 2 \times Ar \times Dr}} \quad \text{[Formula 2]}$$

The determination section 22 also derives a stability index value J for each of the following vehicles specified as the following vehicles, the collision possibility of which should be determined, and the stability index value J represents a stability degree of the relative distance Dr of each of the following vehicles to the straddle-type vehicle 100. That is, the stability index value J is an index value that depends on the information on the surrounding environment at the rear, and is defined as an index value of the stability degree of the relative distance Dr of the following vehicle to the straddle-type vehicle 100. The determination section 22 determines for each of the specified following vehicles whether the derived stability index value J exceeds a reference value, and thereby determines whether the following vehicle that travels at a substantially equal speed to that of the straddle-type vehicle 100 exists behind the straddle-type vehicle 100. The reference value may vary according to a setting state by the rider.

For example, the stability index value J is a value that varies according to a time in which an absolute value of the relative speed Vr of the following vehicle to the straddle-type vehicle 100 is maintained to be equal to or smaller than a reference amount, that is, a time in which a fluctuation amount of the relative distance Dr is maintained to be equal to or smaller than the reference amount. In addition, for example, the stability index value J is a value that varies according to an average value of the absolute value of the relative speed Vr in a reference time, that is, the fluctuation amount of the relative distance Dr in the reference time. Here, it means that the stability degree of the relative distance Dr becomes higher as the stability index value J is increased.

Then, if it is determined that the following vehicle with the high collision possibility exists behind the straddle-type vehicle 100 and that the following vehicle travels behind the straddle-type vehicle 100 at the substantially equal speed to that of the straddle-type vehicle 100, the determination section 22 determines that the assistance operation is necessary. If not, the determination section 22 determines that the assistance operation is not necessary. In the case where the determination section 22 determines that the assistance operation is necessary, the control section 23 makes the execution device P execute the assistance operation.

The execution device P includes an alarm 30. The alarm 30 executes notification operation to the rider as the assistance operation. The alarm 30 may notify the rider by sound (that is, a sensation through an auditory organ as a sensory organ), may notify the rider by a display (that is, a sensation through a visual organ as the sensory organ), may notify the rider by vibrations (that is, a sensation through a tactile organ as the sensory organ), or may notify the rider by a combination of those. More specifically, the alarm 30 is a speaker, a display, a lamp, a vibrator, or the like, may be provided to the straddle-type vehicle 100, or may be provided to an accessory such as a helmet that is associated with the straddle-type vehicle 100. In addition the alarm 30 may be constructed of a single output device or may be constructed of multiple output devices of the same type or different types. The multiple output devices may be provided integrally or may be provided separately.

The execution device P includes a warning device 40. The warning device 40 executes warning operation to the following vehicle as the assistance operation. The warning device 40 may warn the following vehicle by the display (that is, the sensation through the visual organ as the sensory organ), may warn the following vehicle by the sound (that is, the sensation through the auditory organ as the sensory organ), or may warn the following vehicle by a combination of those. More specifically, the warning device 40 is the lamp, the display, the speaker, or the like, may be provided to the straddle-type vehicle 100, or may be provided to the accessory such as the helmet that is associated with the straddle-type vehicle 100. In particular, the warning device 40 is preferably a brake lamp of the straddle-type vehicle 100. In addition, the warning device 40 may be constructed of the single output device or may be constructed of the multiple output devices of the same type or the different types. The multiple output devices may be provided integrally or may be provided separately.

The execution device P includes a speed controller 50 that is provided to the straddle-type vehicle 100. The speed controller 50 executes speed correction operation as the assistance operation. The speed correction operation is operation to correct acceleration/deceleration or the speed that is generated on the straddle-type vehicle 100 by adaptive cruise control of the straddle-type vehicle 100. The speed controller 50 may control operation of a mechanism that generates a propelling force on the straddle-type vehicle 100, or may control operation of a mechanism that generates a braking force on the straddle-type vehicle 100. For example, under a situation where the straddle-type vehicle 100 is automatically decelerated by the adaptive cruise control, in the case where the determination section 22 determines that the assistance operation is necessary, the execution device P executes the speed correction operation to reduce target deceleration in the automatic deceleration for correction. The execution device P may execute the speed correction operation to increase a target speed in the automatic deceleration for the correction. In addition, for example, under a situation where the straddle-type vehicle 100 is automatically accelerated by the adaptive cruise control, in the case where the determination section 22 determines that the assistance operation is necessary, the execution device P executes the speed correction operation to increase target acceleration in the automatic acceleration for the correction. The execution device P may execute the speed correction operation to increase the target speed in the automatic acceleration for the correction.

Note that the adaptive cruise control is defined as control to make the straddle-type vehicle 100 travel according to a distance from the straddle-type vehicle 100 to a preceding vehicle, motion of the straddle-type vehicle 100, and the rider's instruction. Since details of the adaptive cruise control is already well-known for other vehicles such as an automobile, the description thereon will not be made. The straddle-type vehicle 100 is provided with a surrounding environment detector (not illustrated) that acquires forward surrounding environment information.

The execution device P may include a device other than the alarm 30, the warning device 40, and the speed controller 50. In addition, any of the alarm 30, the warning device 40, and the speed controller 50 may not be provided. Furthermore, the rider-assistance system 1 may actuate the alarm 30, the warning device 40, and the speed controller 50 simultaneously, or may actuate the alarm 30, the warning device 40, and the speed controller 50 at different timing.

<Operation of Rider-Assistance System>

A description will be made on operation of the rider-assistance system according to the embodiment.

FIG. 3 is a chart of an operation flow of the processor in the rider-assistance system according to the embodiment of the present invention.

The processor 20 repeatedly executes the operation flow illustrated in FIG. 3 during the travel of the straddle-type vehicle 100.

(Acquisition Step)

In step S101, the acquisition section 21 acquires the surrounding environment information that corresponds to the output of the surrounding environment detector 11. The acquisition section 21 also acquires the travel state information that corresponds to the output of the travel state detector 12.

(Determination Step)

In step S102, on the basis of the information acquired in step S101, the determination section 22 determines whether the following vehicle with the high collision possibility exists behind the straddle-type vehicle 100 and the following vehicle travels behind the straddle-type vehicle 100 at the substantially equal speed to that of the straddle-type vehicle 100. If Yes, the processing proceeds to step S103. If No, the processing returns to step S101.

(Control Step)

In step S103, the control section 23 makes the execution device P execute the assistance operation.

<Effects of Rider-Assistance System>

A description will be made on effects of the rider-assistance system according to the embodiment.

The processor 20 includes: the acquisition section 21 that acquires the surrounding environment information about the straddle-type vehicle 100; the determination section 22 that determines the necessity of the assistance operation executed by the rider-assistance system 1 to assist with the rider's operation; and the control section 23 that makes the execution device P execute the assistance operation in the case where the determination section 22 determines that the assistance operation is necessary. The surrounding environment information includes the information on the surrounding environment behind the straddle-type vehicle 100. The determination section 22 determines the necessity of the assistance operation by using: the collision index value I, which is the index value depending on the information on the surrounding environment at the rear and is the index value of the collision possibility of the following vehicle against the traveling straddle-type vehicle 100; and the stability index value J, which is the index value depending on the information on the surrounding environment at the rear and is the index value of the stability degree of the relative distance Dr of the following vehicle to the traveling straddle-type vehicle 100. Thus, it is possible to execute the assistance operation for the rider regarding the collision by the following vehicle on the basis of the determination with high reliability. Therefore, the rider's safety is improved.

Preferably, the determination section 22 determines that the assistance operation is necessary in the case where the collision index value I is the index value with the higher collision possibility than a determination criterion and the stability index value J is the index value with the higher stability degree than a determination criterion. With such a configuration, the assistance operation for the rider can be executed in a state where the following vehicle, the collision possibility of which is not extremely high, travels at the substantially equal speed to that of the straddle-type vehicle 100. Therefore, the rider's safety is improved.

Preferably, the collision index value I is a value that varies according to at least one of the relative distance Dr, the relative speed Vr, and the relative acceleration Ar of the following vehicle to the traveling straddle-type vehicle 100. With such a configuration, it is possible to execute the assistance operation for the rider regarding the collision by the following vehicle on the basis of the determination with higher reliability. Therefore, the rider's safety is improved.

Preferably, the stability index value J is the value that varies according to the time in which the fluctuation amount of the relative distance Dr is maintained to be equal to or smaller than the reference amount. With such a configuration, it is possible to execute the assistance operation for the rider regarding the collision by the following vehicle on the basis of the determination with higher reliability. Therefore, the rider's safety is improved.

Preferably, the stability index value J is the value that varies according to the fluctuation amount of the relative distance Dr in the reference time. With such a configuration, it is possible to execute the assistance operation for the rider regarding the collision by the following vehicle on the basis of the determination with higher reliability. Therefore, the rider's safety is improved.

Preferably, the determination section 22 changes at least one of the determination criterion of the collision index value I and the determination criterion of the stability index value J according to the setting state by the rider. With such a configuration, the rider's comfort and the rider's safety can be realized simultaneously.

Preferably, the execution device P includes the alarm 30, and the assistance operation includes the notification operation to the rider executed by the alarm 30. With such a configuration, the rider's safety against the collision by the following vehicle is improved.

Preferably, the execution device P includes the warning device 40, and the assistance operation includes the warning operation to the following vehicle that is executed by the warning device 40. With such a configuration, the rider's safety against the collision by the following vehicle is improved.

Preferably, the execution device P includes the speed controller 50 that is provided to the straddle-type vehicle 100. The assistance operation includes the speed correction operation, which is executed by the speed controller 50 to correct the acceleration/deceleration or the speed generated on the straddle-type vehicle 100 by adaptive cruise control of the straddle-type vehicle 100. With such a configuration, the rider's safety against the collision by the following vehicle is improved.

The description has been made so far on the embodiment. However, the present invention is not limited to the description of the embodiment. That is, the present invention includes modified versions of the embodiment that has been described so far. For example, only a part of the embodiment may be implemented, or a part of the embodiment may be modified.

The description has been made so far on the case where the surrounding environment detector 11 is provided to the straddle-type vehicle 100. However, for example, the surrounding environment detector 11 may be provided to a different vehicle from the straddle-type vehicle 100. That is, the acquisition section 21 may acquire the surrounding environment information by inter-vehicular communication. In particular, the surrounding environment detector 11 is preferably provided to the following vehicle with the collision possibility.

In addition, the above-described assistance operation may be executed, for example, only in the case where a speed V generated on the straddle-type vehicle 100 is between a lower limit value and an upper limit value. That is, in the case where the speed V generated on the straddle-type vehicle 100 falls below the lower limit value or exceeds the upper limit value, the determination section 22 may determine that the assistance operation is unnecessary regardless of the collision index value I and the stability index value J. Note that only one of the lower limit value and the upper limit value may be provided. In the case where the lower limit value is provided, the execution of the unnecessary assistance operation is suppressed in a low speed range where the collision by the following vehicle does not lead to a serious situation. Meanwhile, in the case where the upper limit value is provided, the rider is suppressed from feeling uncomfortable by the assistance operation in a high speed range where the rider desires to concentrate on the operation. The determination section 22 may change at least one of the lower limit value and the upper limit value according to the setting state by the rider. In addition, the determination section 22 may compare the speed V itself with a limit value, or may compare another physical quantity that can substantially be converted to the speed V with the limit value.

REFERENCE SIGNS LIST

1: Rider-assistance system
11: Surrounding environment detector
12: Travel state detector
20: Processor
21: Acquisition section
22: Determination section
23: Control section
30: Alarm
40: Warning device
50: Speed controller
100: Straddle-type vehicle

The invention claimed is:

1. A rider-assistance system (1) of a straddle-type vehicle (100), the rider-assistance system comprising:
a processor (20) configured to:
acquire surrounding environment information about the straddle-type vehicle (100);
determine a necessity of assistance operation executed by the rider-assistance system (1) to assist with a rider's operation on the basis of the surrounding environment information; and
control an execution device (P) to execute the assistance operation in response to determining that the assistance operation is necessary, wherein
the surrounding environment information includes information on surrounding environment behind the straddle-type vehicle (100),
the surrounding environment information is information corresponding to output of a sensor provided to the straddle-type vehicle (100),
determining that the assistance operation is necessary in a case where at least a first condition and a second condition are simultaneously satisfied,
the first condition is a determination that, on a basis of a comparison between a collision index value (I) and a first reference value, a collision possibility of the following vehicle against the straddle-type vehicle (100) is higher than a first determination criterion,
the collision index value (I) is an index value depending on the information on the surrounding environment at the rear and is an index value of the collision possibility of a following vehicle against the traveling straddle-type vehicle (100),
the second condition is a determination that, on the basis of a comparison between a stability index value (J) and a second reference value, the following vehicle travels at a lower relative speed (Vr) than a second determination criterion to the straddle-type vehicle (100),
the stability index value (J) is an index value depending on the information on the surrounding environment at the rear and is an index value of a stability degree of a relative distance (Dr) of the following vehicle to the traveling straddle-type vehicle (100).

2. The processor (20) according to claim 1, wherein the collision index value (I) is a value that varies according to at least one of the relative distance (Dr), the relative speed (Vr), and relative acceleration (Ar) of the following vehicle to the traveling straddle-type vehicle (100).

3. The processor (20) according to claim 1, wherein the stability index value (J) is a value that varies according to a time in which a fluctuation amount of the relative distance (Dr) is maintained to be equal to or smaller than a reference amount.

4. The processor (20) according to claim 1, wherein, wherein
the stability index value (J) is a value that varies according to a fluctuation amount of the relative distance (Dr) in a reference time.

5. The processor (20) according to claim 1, wherein the processor (2) is further configured to
change at least one of the first reference value compared with the collision index value (I) and the second reference value compared with the stability index value (J) according to a setting state by the rider.

6. The processor (20) according to claim 1, wherein the processor (20) is configured to,
in the case where a speed (V) generated on the straddle-type vehicle (100) falls below a lower limit value or exceeds an upper limit value,
determine that the assistance operation is unnecessary regardless of the collision index value (I) and the stability index value (J).

7. The processor (20) according to claim 1, wherein the execution device (P) includes an alarm (30), and the assistance operation includes notification operation to the rider executed by the alarm (30).

8. The processor (20) according to claim 1, wherein the execution device (P) includes a warning device (40), and
the assistance operation includes warning operation to the following vehicle executed by the warning device (40).

9. The processor (20) according to claim 1, wherein the execution device (P) includes a speed controller (50) that is provided to the straddle-type vehicle (100), and the assistance operation includes speed correction operation that is executed by the speed controller (50) to correct acceleration/deceleration or speed generated on the straddle-type vehicle (100) by adaptive cruise control of the straddle-type vehicle (100).

10. The processor (20) according to claim 1, wherein the surrounding environment information is information corresponding to output of a sensor provided to the straddle-type vehicle (100).

11. The processor (20) according to claim 1, wherein the surrounding environment information is information corresponding to output of a sensor provided to a different vehicle from the straddle-type vehicle (100).

12. A straddle-type vehicle (100) comprising:
a rider-assistance system (1) that includes a processor (20) configured to:
  acquire surrounding environment information about the straddle-type vehicle (100);
  determine necessity of assistance operation executed by the rider-assistance system (1) to assist with a rider's operation on the basis of the surrounding environment information; and
  control an execution device (P) to execute the assistance operation in response to determining that the assistance operation is necessary, wherein
  the surrounding environment information includes information on surrounding environment behind the straddle-type vehicle (100), and
  the surrounding environment information is information corresponding to output of a sensor provided to the straddle-type vehicle (100),
  determining that the assistance operation is necessary in a case where at least a first condition and a second condition are simultaneously satisfied,
  the first condition is a determination that, on a basis of a comparison between a collision index value (I) and a first reference value, a collision possibility of the following vehicle against the straddle-type vehicle (100) is higher than a first determination criterion,
  the collision index value (I) is an index value depending on the information on the surrounding environment at the rear and is an index value of the collision possibility of a following vehicle against the traveling straddle-type vehicle (100),
  the second condition is a determination that, on the basis of a comparison between a stability index value (J) and a second reference value, the following vehicle travels at a lower relative speed (Vr) than a second determination criterion to the straddle-type vehicle (100),
  the stability index value (J) is an index value depending on the information on the surrounding environment at the rear and is an index value of a stability degree of a relative distance (Dr) of the following vehicle to the traveling straddle-type vehicle (100.

13. A processing method for a rider-assistance system (1) of a straddle-type vehicle (100), the processing method comprising:
  acquiring surrounding environment information about the straddle-type vehicle (100) by a processor (20) for the rider-assistance system (1);
  determining necessity of assistance operation, which is executed by the rider-assistance system (1), by the processor (20) to assist with a rider's operation on the basis of the surrounding environment information; and
  controlling an execution device (P) to execute the assistance operation in response to determining that the assistance operation is necessary, wherein
  the surrounding environment information includes information on surrounding environment behind the straddle-type vehicle (100), and
  the surrounding environment information is information corresponding to output of a sensor provided to the straddle-type vehicle (100),
  determining that the assistance operation is necessary in a case where at least a first condition and a second condition are simultaneously satisfied,
  the first condition is a determination that, on a basis of a comparison between a collision index value (I) and a first reference value, a collision possibility of the following vehicle against the straddle-type vehicle (100) is higher than a first determination criterion,
  the collision index value (I) is an index value depending on the information on the surrounding environment at the rear and is an index value of the collision possibility of a following vehicle against the traveling straddle-type vehicle (100),
  the second condition is a determination that, on the basis of a comparison between a stability index value (J) and a second reference value, the following vehicle travels at a lower relative speed (Vr) than a second determination criterion to the straddle-type vehicle (100),
  the stability index value (J) is an index value depending on the information on the surrounding environment at the rear and is an index value of a stability degree of a relative distance (Dr) of the following vehicle to the traveling straddle-type vehicle (100).

\* \* \* \* \*